United States Patent [19]

Chen et al.

[11] Patent Number: 5,686,523
[45] Date of Patent: Nov. 11, 1997

[54] AQUEOUS CURABLE SILANE/POLYMER COMPOSITIONS

[75] Inventors: Ming J. Chen, Garnerville; Frederick D. Osterholtz, Pleasantville; Eric R. Pohl, Mt. Kisco; Antonio Chaves, White Plains; Phil E. Ramadatt, New York, all of N.Y.

[73] Assignee: OSi Specialties, Inc., Greenwich, Conn.

[21] Appl. No.: 540,142

[22] Filed: Oct. 6, 1995

Related U.S. Application Data

[63] Continuation-in-part of Ser. No. 452,163, May 26, 1995, abandoned.

[51] Int. Cl.$^6$ .................................................. C08L 43/04
[52] U.S. Cl. ........................................ 524/547; 524/806
[58] Field of Search ................................ 524/506, 529, 524/547, 806

[56] References Cited

U.S. PATENT DOCUMENTS

| | | |
|---|---|---|
| 3,449,293 | 6/1969 | Burzynski et al. |
| 3,499,870 | 3/1970 | Hadlock et al. |
| 3,629,214 | 12/1971 | Buning et al. |
| 3,706,697 | 12/1972 | Backderf. |
| 3,729,438 | 4/1973 | Plesich et al. |
| 3,755,252 | 8/1973 | Buning et al. |
| 3,814,716 | 6/1974 | Plesich et al. |
| 3,821,174 | 6/1974 | Buning. |
| 4,049,869 | 9/1977 | De Long. |
| 4,062,451 | 12/1977 | Gander. |
| 4,309,326 | 1/1982 | Sage et al. |
| 4,394,418 | 7/1983 | Temple. |
| 4,399,247 | 8/1983 | Ona et al. |
| 4,526,930 | 7/1985 | Keogh. |
| 4,684,697 | 8/1987 | Chang et al. |
| 4,687,818 | 8/1987 | Kawakubo et al. |
| 4,716,194 | 12/1987 | Walker et al. |
| 4,719,194 | 1/1988 | Cietek et al. |
| 4,778,624 | 10/1988 | Ohashi et al. |
| 4,788,254 | 11/1988 | Kawakubo et al. |
| 4,818,779 | 4/1989 | Witucki et al. |
| 4,877,654 | 10/1989 | Wilson. |
| 4,889,747 | 12/1989 | Wilson. |
| 5,017,632 | 5/1991 | Bredow et al. |
| 5,100,955 | 3/1992 | Pons et al. |
| 5,196,054 | 3/1993 | Schmuck et al. .............. 106/2 |
| 5,219,925 | 6/1993 | Stephens ...................... 524/860 |
| 5,226,954 | 7/1993 | Suzuki ........................ 106/2 |
| 5,385,955 | 1/1995 | Tarshiani et al. |

FOREIGN PATENT DOCUMENTS

| | | |
|---|---|---|
| 2093606 | 10/1993 | Canada. |
| 0401496 | 12/1990 | European Pat. Off. |
| 625502 | 1/1994 | Japan. |

OTHER PUBLICATIONS

Chemical Abstract No. 86,18947, 1977.
Chemical Abstract No. 74,96730 1971.
Chemical Abstract No. 120:56799f, 1994.
Chemical Abstract No. 93:97224g, 1980.
Bourne, T.R., Bufkin, B.G., Wildman, G.C., Grawe, J.R.; Feasibility of Using Alkoxysilane–Functional Monomers; Univ. of Mississippi; 1982.
Lutz, M.A., Polmanteer, K.E.; Methyltrimethoxysilane Modification of Organic Latexes; Dow Corning Corp. May, 1979.

*Primary Examiner*—Jeffrey T. Smith
*Attorney, Agent, or Firm*—Scully, Scott, Murphy & Presser

[57] ABSTRACT

Stable alkoxy silane containing compositions and methods for the preparation of a stable silane containing compositions comprising: (I) a water insoluble or slightly soluble alkoxy silane; (II) emulsifier; (III) water; and (IV) water dispersible or emulsified polymer containing an alkoxy silane functional group. Also provided are two part systems such that an alkoxy silane emulsion comprising components (I)–(III) are combined and the component (IV) may be added upon use of components (I) to (III). Moreover, additional components, (V), such as catalysts and pH buffers may be added.

34 Claims, No Drawings

AQUEOUS CURABLE SILANE/POLYMER COMPOSITIONS

The present application is a continuation-in-part of U.S. application Ser. No. 08/452,163, filed May 26, 1995 now abandoned.

BACKGROUND OF THE INVENTION

Aqueous based dispersion polymers, useful as ingredients in coating and sealant compositions, have been proposed as alternatives to the conventional organic solvent based polymer compositions due to problems associated with environmental pollution, conservation of resources and providing a safe working environment. In particular, much attention has been paid to reactive polymer emulsions and dispersions because of the ease with which they provide improved properties such as water and solvent resistance. For example, U.S. Pat. No. 4,062,451 discloses a silyl group-containing polymer emulsion obtained by emulsion polymerization of a polymerizable monomer having a hydrolyzable silyl group, an alkyl (meth)acrylate and another monomer in an aqueous medium.

Such reactive polymers have not achieved the properties of solvent based polymer, due to their tendency to undergo unacceptable viscosity increase or gelation over an impractically short period of time in systems with sufficient silane content to obtain improved properties. This lack of shelf stability is due to crosslinking reactions which take place at the pendant silyl groups of the organic polymers. Numerous attempts to solve this problem have been presented.

For example, attempted solutions include unexamined Japanese Patent Application No. 6025502 which teaches a shelf-stable composition comprising a silylated polymer emulsion. The shelf stability of the silylated polymer emulsion is achieved by using sterically hindered alkoxy groups attached to the silyl group, which slows hydrolysis of the silyl ester groups. This approach reduces the reactivity of the system substantially and the inventors therefore have recommended catalysts to speed the cure, offering, without discrimination, a wide range of catalysts. Many catalysts selected from this group produce films that have craters and granular particles on the surface and uneven crosslinkage in the film.

Additionally, the ability of monomeric silanes to migrate from polymer formulations to the substrate interface and improve this bonding is well known. In surface treatments, monomeric silanes can be used as additives in paints, inks, and adhesives and also as reactive intermediates for organic resin modification. In addition, water-soluble and monomeric silanes have been added to a latex and hydrolyzed to form an interpenetrating polymer network with improved properties.

Lutz and Polmanteer (J. Coatings Technology) reported the incorporation of methyltrimethoxysilane or its hydrolyzed species into organic latexes to provide room temperature curing films of improved solvent resistance and reinforcement. The formation of a polymer network consisting of a hard, $MeSi(OH)_xO_{(3-x)/2}$ resinous precipitate. The development of a polymer floc, a substantial increase in viscosity, or the formation of a continuous gel network, however, limited use of this concept.

Japanese Patent No. 05,140,502 discloses a coating composition prepared by absorbing $MeSi(OEt)_3$ onto a copolymer and polymerizing the silanes. U.S. Pat. No. 4,309,326 discloses an aqueous polyester size emulsion for glass fiber comprising an unsaturated water-emulsifiable, silylated polyester resin, an EVA copolymer, and a copolymer of vinyl acetate and a prehydrolyzed, water soluble organosilane. U.S. Pat. No. 4,394,418 discloses an aqueous sizing composition of a silylated polyvinylacetate latex containing a low level of silane copolymerized with the vinylacetate, a water soluble silane, non-ionic surfactants, a polyethylene-containing polymer, a glass fiber lubricant, a hydrocarbon acid and water. The monomeric silanes used in this patent are epoxysilanes and aminosilanes and can be mixed with acrylate containing water soluble silanes. The shelf life of these compositions, however, is generally less than 72 hours.

Emulsions of trialkoxysilanes have been previously reported, e.g., U.S. Pat. No. 5,393,330. The silanes discussed in these patents are unsubstituted or halogenated alkyltrialkoxysilanes used as waterproofing agents. U.S. Pat. No. 4,778,624 discloses a method for the preparation of a stable aqueous emulsion of a poly(silsesquioxane) from substituted and unsubstituted alkylsilanes. These patents, however, did not contemplate the use of these stable silane emulsions to crosslink nor improve the end-use properties of waterborne silylated organic polymers.

SUMMARY OF THE INVENTION

The present invention provides stable alkoxy silane containing compositions and methods for the preparation of a stable silane containing compositions comprising: (I) an unhydrolzyed, water insoluble or slightly soluble alkoxy silane; (II) emulsifier; (III) water; and (IV) water dispersible or emulsified polymer containing an alkoxy silane functional group. Also provided are two part systems such that an alkoxy silane emulsion comprising components (I)–(III) are combined and the component (IV) may be added upon use of components (I) to (III). Moreover, additional components, (V), such as catalysts and pH buffers may be added.

The method of the present invention for the preparation of a shelf stable composition comprises: (a) dispersing a water insoluble or slightly soluble alkoxy silane in an aqueous solution with emulsifier to yield an aqueous emulsion, and (b) adding the silane emulsion to a water dispersed or emulsified organic polymer which chemically bond therein an alkoxy silane functional group. Another aspect of the present invention is to provide a coating or sealant prepared from or an article coated and cured with the reactive, aqueous dispersion. Elastomeric caulks and sealants are provided with superior shelf stability and wet adhesion properties. The compositions of the present invention are stable for at least about three (3) months and up to 12 months. Moreover, improved properties in coatings prepared from the compositions such as solvent resistance, adhesion, smoothness, hardness and mar resistance are achieved with compositions of the present invention. A unique characteristic of these coatings is the ability to self-heal after being scratched or abraded.

DETAILED DESCRIPTION OF THE INVENTION

The present invention provides highly stable alkoxy silane containing compositions that do not seed nor gel during storage. Generally, they are stable for at least two to three months. In fact, those compositions containing less than twenty weight percent silane last longer than six months of storage. This compares favorably with the prior art which taught silane/polymer compositions that had high levels of silane would lose properties, such as build viscosity or even gel after two to three weeks.

The present compositions allow for surprisingly high levels of silane as monomer and as part of the polymer. It is the high level of silane which allows for improved properties of the present compositions after curing. Previously, such high levels of silanes would have caused the composition to deteriorate upon storage. For example, attempting to incorporate greater than one percent silane monomer into a waterborne silane compatible polymer generally led to seeding of the polymer emulsion during preparation.

The addition of greater than two weight percent monomeric organofunctional silane to waterborne polymers, such as 3-glycidoxypropyltrimethoxy silane or 3-amino propyltrimethoxysilane, results in an increase in the viscosity and occasionally gelation of the composition. Although lower levels of monomeric organofunctional silane, generally in the range of 0.1 to 0.8 weight percent, have been successfully incorporated in waterborne polymer systems without undue viscosity increases of the composition, the benefits achieved by the added silane, such as adhesion promotion, are lost after storage for only a few weeks or months. With the present invention, silane can be incorporated at levels up to and including twenty percent without increases in composition viscosity in storage.

Moreover, the present invention is surprising in its level of reactivity. The prior art taught that a catalyst was required, which was not surprising. This present invention allows for storing compositions as a whole without fear of gelation. The formation of the silane emulsion allows the silane and polymer to remain in solution together without reacting. However, the system is reactive enough so that the silane and polymer will react upon curing. The reactivity of the silane and silylated polymer is illustrated by the significant increases in end use properties, such as greater than doubling of MEK rubs of the polymer without the silane. Thus, with the present invention, it has been surprisingly found that a balance could be struck between reactivity and non-reactivity (shelf-life) while achieving a workable composition.

The compositions are comprised of the following:

(I) SILANES

The water insoluble or slightly soluble alkoxy silanes for use herein are of the general structure $Y-R^1_a R^3_b Si(OR^2)_{4-a-b}$ where $R^1$ is an organofunctional substituted alkylene, arylene or aralkylene group, which may have from two to thirty carbon atoms; $R^2$ is an alkyl or alkoxy-substituted alkyl, aryl, or aralkyl group having from two to ten carbon atoms; $R^3$ is an alkyl, aryl or aralkyl group having from one to sixteen carbon atoms, a is zero to two, and b is zero to two, with the proviso that a+b is 1, or 2. Each R group may be cyclic, branched or linear and may contain heteroatom substitutions for carbon atoms, such as sulfur or oxygen atoms. It is preferred that each R have no carbon-carbon double bonds which are polymerizable by free radical mechanisms since said unsaturations can react even after the compositions of the present invention are cured, e.g., undergo oxidation. Silanes without such unsaturations are hereinafter referred to as "saturated" silanes, though this term does include aryl, aralkyl silanes and other aromatic ring structures. Unsaturated silnaes may be used herein if reactivity is desired, but in such cases the usilane should be different than monomers used made to make polymer, e.g., a urethane polymer should be used with a vinyl silane. Y is an organofunctional group which may include mercapto, halo, amino, vinyl, carboxyl, (meth)acryl, ester, cyano, aldehyde, acids, epoxy, silyl esters and the like. The silane is usually provided in a substantially non-hydrolyzed form. Alkoxy silanes often are referred to as "silane esters" by those familiar with silane technology due to their resemblance to esters of silica acid.

The term water insoluble or slightly soluble silanes includes alkoxy silanes with solubilities between 0 and 8.0 weight percent in water at 25° C. Water insoluble alkoxy silanes with solubilities between 0 and 1 weight percent in water at 25° C. are preferred. Water soluble alkoxy silanes are not used because compositions made with such silanes are not stable for extended periods of time, i.e., more than two to three days at ambient conditions. Therefore, the R groups should be chosen to ensure lack of solubility of the silane in water.

Y is exemplified by mercapto, glycidyloxy, cycloalphatic epoxy, methacryloxy, acryloxy, chloro, bromo, iodo, cyano, vinyl, ketone, aldehyde, carboxylate, silyl group (e.g.,-$SiR^3_b(OR^2)_{3-b}$), amino, alkylamino or dialkylamino, arylamino or diarylamino; $R^1$ is exemplified by ethylene, propylene, isopropylene, isobutylene, octyl, phenylene, tolylene, xylene, benzyl, cyclohexylene, phenylethyl and the like. $R^2$ is exemplified by ethyl, n-propyl, n-butyl, h-hexyl, n-heptyl, n-octyl, n-nonyl, n-decyl, cyclopentyl, cylcohexyl, cycloheptyl, cyclooctyl isobutyl, sec-butyl, isobutyl, sec-amyl and 4-methyl-2-pentyl. $R^3$ is exemplified by methyl, ethyl, n-propyl, n-butyl, n-hexyl, n-heptyl, n-octyl, lauryl, isopropyl, isobutyl, isoamyl, isopentyl and phenyl. $R^2$ and $R^3$ may be combined in a ring structure.

Examples of the above-mentioned silane compounds include methyltris-(isobutoxy)silane, dimethyldipropoxysilane, ethyltris-(isopropoxy)silane, propyltris-(isobutoxy)silane, butyltributoxysilane, octyltriethoxysilane, amyltributoxysilane, amyltriethoxysilane, β-(3,4-epoxycylcohexyl)ethyltris-(isobutoxy)silane, 3-glycidoxypropyltris-(isobutoxy)silane, 3-methacryloxypropyltris-(isobutoxy)silane, dodecyltriethoxysilane, vinyl tris-(isopropoxy)silane, vinyltris-(isobutoxy)silane, phenyltriethoxysilane, 3-acryloxypropyltriethoxysilane, 3-mercaptopropyltriethoxysilane, dimethylbis-(isobutoxy) silane, diethyldipropoxysilane, dibutylbis-(isopropoxy) silane, diphenyldipropoxysilane, vinylmethylbis-(isproxy) silane, 3-methacryloxypropylmethyl-dibutoxysilane, and bis or tris silanes such as 1,2 bis-(alkoxy) silyl ethanes and tris(3-triethoxysilylpropyl) isocyanurate.

The silane(s) is present at 0.1 to 20 percent by weight of the total composition [(I)–(IV)] depending on the degree of property improvement desired. The preferred concentration is about 0.1 to 10 percent of the weight of the total composition. In preparing the precursor silane emulsion, as defined by components (I)–(III), the silane(s) is present at 0.1 to 60 weight percent.

Although there is no intention to be bound by any theory, it is believed that the alkoxy silane and silylated polymer mixture needs to be mutually compatible after the emulsion breaks and interdiffuse with each other to allow reaction of the alkoxy silane with the silyl group of the polymer to form a network. A useful guide to predicting the compatibility of the alkoxy silane with the silylated polymer is the Hildebrand solubility parameter. When the difference in solubility parameters between the alkoxy silane and silylated polymer is approximately $2(cal/cm^3)^{1/2}$ or less, the alkoxy silane and silylated polymer are compatible. When the difference of solubility parameters between the alkoxy silane and silylated polymer are greater than $2(cal/cm^3)^{1/2}$, a blend or mixture of two or more silanes can be used to achieve the desired solubility parameter. Failure to match the solubility parameters may result in defects, including oily, hazy, or otherwise poor quality surfaces.

(II) EMULSIFIER

The emulsifiers for use herein include nonionic, anionic or cationic surfactants or mixtures of nonionic with anionic or cationic surfactants. Examples of the nonionic surfactants include polyoxyethylene alkyl ethers, polyoxyethylene alkyl phenyl ethers, polyoxyethylene fatty acid esters, sorbitan fatty acid esters, and polyoxyethylene sorbitan fatty acid esters. Examples of the anionic surfactants include fatty acid salts, alkyl sulfate ester salts, alkyl benzene sulfonate, alkyl phosphate, alkylallyl sulfate ester salt, and polyoxyethylene alkylphosphate ester. Examples of the cationic surfactants include quaternary ammonium salts such as long chain alkyl trimethylammonium salts, long chain alkyl benzyl dimethyl ammonium salts, and di(long chain alkyl)dimethyl ammonium salts. A further listing of surfactants useful in the present invention may be those described in 1994 McCutcheon's Vol. 1: *Emulsifiers and Detergents*, North American Edition (Manufacturing Confectioner Publishing Co., Glen Rock) 1994, which is incorporated herein by reference.

The emulsifier(s) should be present in the range of 0.05 to 30 weight percent based on weight of the total composition [(I)–(IV)] and preferably 0.2 to 20 weight percent of the total composition. In the precursor alkoxy silane emulsion, the emulsifier should be present at 0.1 to 50 weight percent of the alkoxy silane (I).

The appropriate HLB (hydrophobic-lipophilic balance) of the surfactants is chosen to correspond to the HLB of the specific alkoxy silane being emulsified. The method for selecting to optimum HLB for a substance is well known to one skilled the art and described in "The HLB System" by ICI Americas Inc., which is incorporated herein by reference.

Because the reactive polymer emulsion, as defined by components (II)–(IV), may be prepared prior to the addition of the precursor alkoxy silane emulsion, emulsifiers of the type described above can be used in preparing these precursor compositions. Again, the emulsifiers are chosen so that the appropriate HLB is chosen to correspond to the HLB of the specific reactive polymer being emulsified with the proviso that the emulsifier(s) chosen to emulsify the reactive polymer are compatible with the emulsifier(s) used to make the precursor alkoxy silane emulsion. In the precursor reactive polymer emulsion, the emulsifier should be present at 1 to 50 weight percent of the reactive polymer.

(III) WATER

The water may be present in an amount ranging from 30 to 99 weight percent of the total composition (I)–(IV). When a precursor silane emulsion (I)–(III) is made without the polymer, about 39 to 99.25% by weight water should be present. When a precursor solution of (II)–(IV) is made, about 29.2 to 99.8 percent by weight water should be present.

(IV) POLYMERS

The reactive polymers of the present invention are those which have an alkoxy silane group ("silyl ester") thereon, preferably in the form of $R^6R^5_eSi(OR^4)_{3-e}$, where $R^5$ is an alkyl, aryl, or aralkyl group having one to ten carbon atoms; $R^4$ is a hydrogen atom or an alkyl or alkoxy-substituted alkyl, aryl or aralkyl group having from one to ten carbon atoms or another silyl group, with the proviso that not all of the $R^4$ groups are silyl groups; and e is an integer of zero, one or two. $R^6$ is an alkylene, arylene, aralkylene group or the polymer backbone itself with the proviso that $R^6Si$ is bound to the polymer through a Si—C bond. Exemplary of such polymers are those which contain terminal or pendant silyl groups ($—R^5_eSi(OR^4)_{3-e}$). These reactive polymers have molecular weights between 300 and $10^8$ gms/mole. The reactive polymer contains a silyl ester group in an amount sufficient to react with the alkoxy silane emulsion. This is generally between 0.01 and 20 weight percent, and preferably between 0.1 and 4.0 weight percent. Very low molecular weight polymers will have a higher percent silane content due to the molecular weight of the silane itself. Varying the amount of silane in the polymer affects the performance properties of the composition, as well as the stability.

Examples of reactive polymers which can be used in the present invention include silylated polymers chosen from the following: polyethylene, polypropylene, polyethylene propylene copolymers, urethanes, epoxies, polystyrenes and urethane acrylic polymers. Also useful herein are acrylic homopolymers, vinyl polymers, vinyl acetate polymers, vinyl acrylic polymers, methacrylic polymers, styrene acrylic copolymers, and polyesters. These reactive polymers may also contain other organic functional groups and polymers, including hydroxyl, carboxyl amide, vinyl and halogen groups are contemplated as being within the scope of reactive polymers.

Illustrative of suitable straight chain hydrocarbon radicals for use as $R^4$ in the formula set forth above are methyl ethyl propyl, n-butyl n-pentyl n-hexyl, n-heptyl, n-octyl, n-nonyl, n-decyl and the like, and cyclo-radicals such as cyclopentyl, cyclohexyl cycloheptyl cyclooctyl bicycloheptyl and the like. Illustrative of suitable branched chain hydrocarbon radicals for $R^4$ are alkyl radicals such as isopropyl isobutyl sec-butyl, isoamyl iso-octyl, 1-ethyl 3-methyl pentyl, 1,5 dimethyl hexyl 4-methyl-2-pentyl and the like. The most preferable $R^4$ are groups of less than five carbons, and more preferably less than four carbons, such as methyl ethyl propyl isopropyl sec-butyl iso-butyl and sec-amyl.

Steric hindrance of the $R^4$ group slows down or prevents hydrolysis of the silyl group $R^5_eSi(OR^4)_{3-e}$, and allows incorporation of higher levels of the silyl group into the polymer backbone without seeding or undue viscosity increases of the silylated polymer emulsion on shelf-ozing, but retards or prevents the reaction of the silane emulsion with the silylated polymer during cure. Therefore, a balance must be struck between the reactivity of the alkoxysilyl group of the polymer and the concentration of the silane in the polymer. The preferred balance is to use 0.1 to 4.0 weight percent silane in the polymer backbone with $R^4$ groups that are less than 4 carbon atoms.

$R^5$ is a monovalent hydrocarbon having from one to ten carbon atoms, for example, an alkyl group (e.g., methyl ethyl, propyl, octyl or decyl) or an aryl group (e.g., phenyl, benzyl, phenethyl or tolyl). $R^6$ is the group that links the silane pendant or terminal group to the polymeric backbone and may be a straight or branched alkyl group, arylalkyl group or aryl group, generally has about from 1 to 18 carbons and may have substituents thereon or may be the polymer itself. The silicon atom is bound to the polymer through a silicon carbon bond on $R^6$, which provides hydrolytic and thermal stability to the silylated polymer.

Substituents to the $R^6$ group may include a replacement for a carbon atom with atoms such as oxygen, nitrogen or sulfur, with the proviso that the carbon atom adjacent to the silicon is not replaced. Other substituents include replacement of the hydrogen atom attached to carbon with halogen atoms, nitrogen, sulfur, oxygen, and organofunctional groups, such as cyano, urea, esters, amides, oxo and the like.

The polymers may be prepared by any polymerization technique known in the art, such as, suspension polymerization, interfacial polymerization, solution polymerization or emulsion polymerization. Emulsion polymerization of ethylenically unsaturated monomers in the presence of certain surfactants is the preferred polymerization technique for vinyl and acrylic polymers because the aqueous dispersion of latex polymer particles so formed can be used directly or with minimal work-up in preparing the aqueous compositions of the present invention. These polymerizations may be conducted as is well known in the art.

Polymers suitable for dispersing in water usually incorporate solubilizing groups, such as nonionic, anionic, or cationic groups. Nonionic groups include hydroxyl, carbonyl, polyalkylene oxide and the like. Artionic groups include salts of sulfates, phosphates, carboxylates and the like. Cationic groups include protonated amines, quaternary ammonium salts and the like. Combinations of the above solubilizing groups of nonionic with either cationic or anionic groups may be used. Polymer dispersions may be prepared by techniques well known in the art.

The polymer may be added to water as an emulsion or dispersion. If the polymer is an emulsion, some amount of emulsifier will be required.

The polymer should be present at 0.1 to 70 weight percent of the total composition (I)–(IV) and of the precursor solution (II)–(IV) at 0.2 to 70.1 weight percent, depending upon the desired performance levels.

(V) OPTIONAL INGREDIENTS

The composition of the present invention additionally may contain crosslinking agents, such as urea and melamine resins which are methylolated and/or alkoxylated, epoxy resins, aziridines and carbodiimides. Such agents may be present at 0.1 to 20 weight percent of the total composition, as long as they do not destabilize the composition during storage.

The compositions of the present invention optionally may comprise water soluble/emulsifiable/dispersible curing catalysts, which are hydrolytically stable, to modulate the curing conditions, so long as said catalysts do not destabilize the composition during storage. Examples of such catalysts are organotitanate, organotin, chelated titanium, aluminum and zirconium compounds, and combinations thereof. Examples of chelated titanates are dihydroxy bis [2-hydroxypropanato (2-)-$O^1,O^2$](2-)titanate, mixed titanium ortho ester complexes, TYZOR® 101, TYZOR GBA (acetylacetonate chelate), bis(ethyl-3-oxobutanolato $O^1,O^3$] bis(2-propanolato) titanium, TYZOR CLA, isopropoxy (triethanolaminato) titanium and alkanolamine complex of titanium, with TYZOR 131, LA, and 101 being preferred, all commercially available from E. I. DuPont de Nemours and Co. of Wilmington, Del. Examples of organotin catalysts are FOMREZ® UL-1, UL-22, and UL-32 available from Witco of Greenwich, Conn. and dibutyltin bis(1-thioglycerol). The catalyst can be used in an amount of 0.01 to 20 percent, preferably 0.1 to 10 parts, based on reactive polymer component (IV).

The pH of the total composition may impact upon its hydrostability. High alkalinity or high acidity of the composition catalyzes the hydrolysis and condensation of the alkoxysilyl group of the silane. The closer the pH of the composition is to neutral, the better the stability of the emulsion. Therefore, the preferred range of pH of the total composition is 5.5 to 8.5. Substances which can be used to adjust the pH are organic or inorganic buffers including sodium acetate, sodium citrate, sodium carbonate, sodium bicarbonate, sodium hydrogen phosphate, sodium dihydrogen phosphate, and the corresponding potassium salts.

Other optional ingredients for inclusion herein are fillers, thixotropes, pigments, plasticizers, coalescing agents, biocides and fungicides as are commonly known and used in the art.

METHOD OF PREPARATION AND USE

The precursor silane emulsions of the present invention are prepared by first mixing the emulsifier (II) with the alkoxy silane (I). Water (III) is added and the mixture is stirred to provide a white, milky emulsion. The pH of the resulting emulsion is adjusted, if necessary, to pH 7.0±1.5.

The precursor alkoxy silane emulsion is added to the reactive dispersion polymer (IV) or to a reactive polymer emulsion [Components (II)–(IV)] to provide a stable composition. The method employed to mix these components is not critical and any commonly used low shear equipment, such as a blade or paddle mixer, is suitable. The optional ingredients (V) may be added at any time, although in some cases, catalysts should be added last. Mixing may occur before packaging and storage or immediately before use, e.g., in a two part system.

The emulsions may be used as two component systems, i.e., components (I)–(III) and component (IV) or components (II)–(IV), are mixed in shortly before use, but have sufficient stability when mixed to be used as one-component systems. The composition of components (I)–(IV) form uniform aqueous dispersions or emulsions. Many uses of these compositions require drying under ambient conditions or at elevated temperatures (e.g., baking). The resulting dried and cured materials have excellent solvent resistance, chemical resistance, hardness, mar resistance, adhesion, water resistance, durability or weatherability. A unique benefit of the compositions of the present invention is their ability to self heal after scratching or abrading.

The compositions do not seed or gel over a three month period of room temperature storage. More preferably compositions have a shelf life of at least six (6) months. These shelf-lives are achieved when the silane of the emulsions are added at concentrations ranging from 0.1 to 20 percent of the composition (I)–(IV).

The compositions of the present invention are intended to be cured upon use. They may be cured at a range of temperatures, including ambient cure or elevated temperature cure. Such curing may be accomplished by standard means in the art. Ambient cure occurs within one week. Faster cures can be achieved at elevated temperatures or with the aid of curing catalysts.

It is possible to use the compositions for various purposes, e.g., paints, adhesives, coating materials, sizes, binders, caulks and sealants, and take advantage of the excellent characteristics of compositions of the present invention. The cured compositions form coatings having excellent solvent resistance, adhesion, hardness or flexibilty (depending upon the polymer component), abrasion resistance, mar resistance, improved scratch resistance, good water permeation resistance, weather resistance, hot water resistance and self-healing properties. Silicon modified compositions can be used to increase thermal stability, impact and chip resistance of coatings. The compositions of this invention are useful for forming protective and/or water repellent coatings on a variety of substrates, such as metal, wood, textiles, leather, and ceramics. A composition according to the present invention, depending on the presence of pigments or other conventional components, may be used as a basecoat, clearcoat, print paste binder, textile binder, paper mating, fiberglass sizing or primer. Cured films having superior solvent resistance may be formed with no surface defects. Waterborne acrylic, vinyl, vinyl acrylic, and other caulks and sealants may be prepared from the present invention and have improved shelf stability while providing excellent wet adhesion.

MEK double rub tests of the latex films illustrate the enhanced siloxane crosslinking effected by the catalysts used in the present invention. Cured compositions made according to the present invention have an MEK rub resistance (performed according to ASTM D 4752-87) of at least 20 and preferably at least 40 after curing under mild conditions and for short periods of time. Higher values result from oven baking, which provides a faster cure. The cured compositions have improved dry adhesion performed according to ASTM 3359-90.

EXAMPLES

1. Preparation of Silylated Acrylic latex A.

The silylated acrylic latex A was prepared by a two stage batch process. Into a one liter reaction vessel equipped with a stirrer, thermometer, dropping funnel and nitrogen gas inlet were charged deionized water (100.0 grams) and IGEPAL CA-897 non-ionic octylphenol ethoxylate surfactant (42.0 grams) from Rhone-Poulenc. A mixture of deionized water (416.4 grams), butyl acrylate (119.5 grams) methyl methacrylate (122.2 grams), methacrylic acid (3.3 grams), aqueous 0.15 percent ferrous sulfate solution (6.0 grams) and ammonium persulfate (1.5 grams) was added at ambient temperature and mixed for 5 minutes. A two percent aqueous solution of sodium formaldehyde sulfoxylate (6.0 grams) was added. The mixture exothermed to a reaction temperature of 60° to 65° C., where upon the mixture was cooled to 35° C. A second mixture of butyl acrylate (98.1 grams), methyl methacrylate (100.4 grams), methacrylic acid (2.7 grams) and 3-methacryloxypropyltrimethoxysilane (13.8 grams) was added to the reaction vessel. A second charge of a two percent aqueous solution of sodium formaldehyde sulfoxylate (6.0 grams) was added to the reaction vessel. The mixture was allowed to heat up to a temperature of 60° to 65° C., and then cooled to 50° C. t-Butyl hydroperoxide -70 (0.1 grams) was slowly added to the reaction mixture followed by a two percent sodium formaldehyde sulfoxylate solution (12.0 grams). The reaction mixture was stirred and then cooled to room temperature. Concentrated ammonium hydroxide solution was used to adjust the pH of the silylated polymer emulsion to 7.5. The silylated polymer emulsion was then strained to remove solid particles.

2. Preparation of Silylated Acrylic Latex B.

Silylated acrylic latex B was prepared by a semi-continuous batch process. Into a one liter reaction vessel that was equipped with a heating mantle, a stirrer, a thermometer, a nitrogen feed line and reactant feed lines were charged deionized water (494.9 grams) and IGEPAL CA-897 surfactant (38.0 grams). The reaction mixture was heated to 85° C. A mixture of butyl acrylate (22.0 grams), methyl methacrylate (22.5 grams), methacrylic acid (0.6 grams) and sodium persulfate (1.0 gm) were added into the stirred reaction mixture through the feed line over a period of 10 minutes. A second mixture of butyl acrylate (178.1 grams), methyl methacrylate (182.3 grams), methacrylic acid (4.8 grams) was pumped into the reaction vessel at a rate so that the temperature of the reaction mixture was maintained at 85° C. A third mixture of butyl acrylate (22.0 grams), methyl methacylate (22.5 grams), methacrylic acid (0.6 grams) and 3-methacryloxypropyltrimethoxysilane (4.6 grams) was added over a period of 30 minutes while maintaining the reaction mixture at 85° C. The reaction mixture was stirred for an additional 30 minutes. t-Butyl hydroperoxide -70 (0.1 grams) was slowly added to the reaction mixture, followed by the addition of two percent aqueous sodium formaldehyde sulfoxylate solution (12.0 grams). Concentrated ammonium hydroxide was used to adjust the pH of the reaction mixture to 7.5. The reaction mixture was then strained to remove solid particles after cooling to room temperature.

3. Comparative Acrylic Latex Y (no silane)

The acrylic latex Y was prepared by a semi-continuous batch process. Into a two liter reaction vessel that was equipped with a heating mantle, a stirrer, a thermometer, a nitrogen feed line and a reactant feed line were charged deionized water (493.5 grams) and IGEPAL CA-897 surfactant (38.0 grams). The reaction mixture was heated to 85° C. A mixture of butyl acrylate (4.9 grams), methyl methacrylate (5.0 grams), methacrylic acid (0.1 grams) and sodium persulfate (1.0 grams) was added into the stirred reaction mixture through the feed line over a period of 10 minutes. A second mixture of butyl acrylate (217.2 grams), methyl methacrylate (222.3 grams) and methacrylic acid (5.9 grams) was pumped into the reaction vessel at a rate so that the temperature of the reaction mixture remained at 85° C. The reaction mixture was stirred for an additional 30 minutes. t-Butyl hydroperoxide-70 (0.1 grams) was slowly added to the reaction mixture followed by the addition of a two percent aqueous sodium formaldehyde sulfoxylate solution (12.0 grams). Concentrated ammonium hydroxide was used to adjust the pH of the reaction mixture to 7.5. The reaction mixture was then strained to remove solid particles after cooling to room temperature.

4. Preparation of Silylated Vinyl Acrylic Latex C

The silylated vinyl acrylic latex C was prepared by a semi-continuous batch process. Into a one liter reaction vessel that was equipped with a heating mantle, a stirrer, a thermometer, a nitrogen feed line and reactant feed lines were charged deionized water (435.5 grams) IGEPAL CA-897 surfactant (26.5 grams), ICEPAL CA-630 nonionic surfactant (3.0 grams) from Rhone-Poulenc, sodium bicarbonate (2.0 grams), NATROSOL 250 MXR hydroxy ethyl cellulose thickener (2.5 grams) from Aqualon of Wilmington, Del., sodium persulfate (1.8 grams) and ABEX EP-110 ammonium salt of sulfated alkyl phenol ethoxylate surfactant (3.6 grams) from Rhone-Poulenc, the reaction mixture was heated to 65° C. A mixture of vinyl acetate (42.5 grams) and butyl acrylate (6.5 grams) was pumped into the reaction vessel and stirred for 15 minutes. The temperature of the reaction mixture was heated to 75° C. A second mixture of vinyl acetate (255.0 grams) and butyl acrylate (39.0 grams) was pumped into the reaction vessel at a rate so that the temperature of the reaction mixture was maintained at 75° C. Finally, a third mixture of vinyl acetate (127.5 grams), butyl acrylate (19.5 grams) and 3-methacryloxypropyltrimethoxysilane (10.0 grams) was slowly added to the reaction vessel. The reaction mixture was then stirred for 30 minutes while maintaining a temperature of 75° C. t-Butyl hydroperoxide-70 (0.1 grams) was added to the reaction vessel followed by a two percent aqueous sodium formaldehyde sulfoxylate solution (25.0 grams). Concentrated ammonium hydroxide was used to adjust the pH of the reaction mixture to 7.5. After cooling to room temperature, the reaction mixture was strained to remove solid particles.

5. Preparation of Silylated Vinyl Acrylic Latex D

The silylated vinyl acrylic latex D was prepared by a semi-continuous batch process. Into a one liter reaction vessel that was equipped with a heating mantle, a stirrer, a thermometer, a nitrogen feed line and reactant feed lines were charged deionized water (435.5 grams), IGEPAL CA-897 surfactant (26.5 grams), IGEPAL CA-630 surfactant (3.0 grams) sodium bicarbonate (2.0 grams), NATROSOL 250 MXR thickeneer (2.5 grams), sodium persulfate (1.8 grams) and ABEX EP-110 surfactant (3.6 grams). The reaction mixture was heated to 65° C. A mixture of vinyl acetate (42.5 grams) and butyl acrylate (7.4 grams) was added into the reaction vessel and stirred for 15 minutes. The temperature of the reaction mixture was heated to 75° C. A second mixture of vinyl acetate (340.0 grams) and butyl acrylate (59.2 grams) was pumped into the reaction vessel at a rate so that the temperature of the reaction mixture was maintained at 75° C. Finally, a third mixture of vinyl acetate (42.5 grams), butyl acrylate (7.4 grams) and 3-methacryloxypropyltrimethoxysilane (1.0 grams) was slowly added to the reaction vessel. The reaction mixture was stirred for 30 minutes while maintaining a temperature of 75° C. t-Butyl hydroperoxide-70 (0.1 grams) was added to the reaction vessel followed by a two percent aqueous sodium formaldehyde sulfoxylate solution (25.0 grams). Concentrated ammonium hydroxide was used to adjust the pH of the reaction mixture to 7.5. After cooling to room temperature, the reaction mixture was strained to remove solid particles.

6. Preparation of Comparative Vinyl Acrylic Latex Z (no silane).

The vinyl acrylic latex Z was prepared by a semicontinuous batch process. Into a one liter reaction vessel that was equipped with a heating mantle, a stirrer, a thermometer, a nitrogen feed line and a reactant feed line were charged deionized water (435.5 grams) IGEPAL CA-897 surfactant (26.5 grams), IGEPAL CA-630 surfactant (3.0 grams), sodium bicarbonate (2.0 grams), NATROSOL 250 MXR thickener (2.5 grams), sodium persulfate (1.8 grams) and ABEX EP-110 surfactant (3.6 grams). The reaction mixture was heated to 65° C. A mixture of vinyl acetate (42.5 grams) and butyl acrylate (7.0 grams) was pumped into the reaction vessel and stirred for 15 minutes. The temperature of the reaction mixture was heated to 75° C. A second mixture of vinyl acetate (382.5 grams) and butyl acrylate (63.0 grams) was pumped into the reaction vessel. The temperature of the reaction mixture was maintained at 75° C. The reaction mixture was stirred for 30 minutes while maintaining a temperature of 75° C. t-Butyl hydroperoxide-70 (0.1 grams) was added to the reaction vessel followed by a two percent aqueous sodium formaldehyde sulfoxylate solution (25.0 grams). Concentrated ammonium hydroxide was used to adjust the pH of the reaction mixture to 7.5. After cooling to room temperature, the reaction mixture was strained to remove solid particles. Table 1 contains a summary of the core positions of the polymer latices.

7. Preparation of Silylated Acrylic Latex E.

Into a two liter reaction vessel that was equipped with a heating mantle, a stirrer, a thermometer, a nitrogen feedline and a reactant feedline were charged deionized water (416.4 grams), 29.6 weight percent aqueous solution of IGEPAL CA-897 surfactant (142 grams), butyl acrylate (21.94 grams), methyl methacrylate (22.46 grams), methacrylic acid (0.59 grams), and 0.15 weight percent aqueous ferrous sulfate solution (6.0 grams). The mixture was purged with nitrogen and stirred for 30 minutes. Ammonium persulfate (1.5 grams) was added at ambient temperature to the reaction mixture and stirred for 5 minutes, followed by the addition of 2 weight percent aqueous sodium formaldehyde sulfoxylate (12 grams) over a 70 minute time period. After stirring the mixture for an additional 10 minutes, a mixture of butyl acrylate (178.19 grams) methyl methacrylate (182.41 grams), methacrylic acid (4.80 grams) was added over a period of 1 hour. The reaction mixture exothermed to a temperature of 65° C. After cooling to 35° C., a mixture of butyl acrylate (21.94 grams), methyl methacrylate (22.46 grams), methacrylic acid (0.59 grams) and 3-methacryloxypropyltrimethoxy silane (4.6 grams) was added, and followed by the addition of a 2 weight percent aqueous sodium formaldehyde sulfoxylate solution (6.0 grams). The reaction mixture exothermed to a final temperature of 65° C. After cooling to 50° C., t-butyl hydroperoxide-70 (0.1 grams), followed by 2 weight percent formaldehyde sulfoxylate (6.0 grams) were added to the reaction mixture over a period of 30 minutes. The pH of the composition was adjusted to 7.5 with ammonium hydroxide and the mixture was strained.

8. Preparation of Emulsion of Silane F, Methyl tris-(isobutoxysilane).

Into a beaker were added SPAN® 60 surfactant (1.82 grams) and of TWEEN® 40 surfactant (1.18 grams) which were heated together in a hot water bath in order to melt the solid materials. Silane F (20.0 grams) was added and the mixture was stirred with a mechanical stirrer. Water (27 grams) was added and the mixture was stirred vigorously for approximately thirty minutes to provide a white emulsion. GIV-GARD DXN (6-acetoxy-2-4-dimethyl m-dioxane) from Givaudan-Roure of Clifton, N.J. was added as a preservative. The emulsion was also prepared without a preservative.

9. Preparation of Emulsion of Silane G, Amyltriethoxysilane.

Into a a beaker were added SPAN® 60 surfactant (2.67 grams) and TWEEN® 40 surfactant (2.53 grams) which were heated together in a hot water bath to melt the solid materials. Silane G (26.0 grams) was added and the mixture was stirred with a mechanical stirrer. Water (33.8 grams) was added and the mixture was stirred vigorously for approximately thirty minutes to provide a white emulsion. GIV-GARD DXN dioxane was added as a preservative. The emulsion was also prepared without a preservative.

10. Preparation of Emulsion of Silane H, Amyltributoxysilane.

Into a beaker were added SPAN 60 surfactant (3.56 grams) and TWEEN 40 surfactant (1.54 grams), which were heated together in a hot water bath in order to melt the solid material. Silane H (28 grams) was added and the mixture was stirred with a mechanical stirrer. Water (33.8 grams) was added and the mixture was stirred vigorously for approximately thirty minutes to provide a white emulsion. GIV-GARD DXN preservative was added. The emulsion was also prepared without a preservative.

11. Preparation of Emulsion of Silane I, Octyltriethoxysilane.

To Silane I (364 grams) were added ARQUAD® 2C75 N-alkyl trimethyl ammonium chloride cationic surfactant (18.2 grams, from Akzo Nobel Chemicals, Inc.) and ARMEEN® DMCD primary alkylamine cationic surfactant (18.2 grams) from Akzo Nobel Chemicals, Inc. in an OSTER blender and mixed at low speed for two minutes. Deionized water (506 grams) was added and the mixture was stirred at a high speed for ten minutes resulting in a white, milky emulsion. SURFYNOL 420 ethoxylated tetramethyl decynediol nonionic surfactant (3.6 grams) from Air Products and Chemicals, Inc. was added and the mixture was stirred for several hours.

12. Preparation of Emulsion of Silane J, β-3,4-Epoxycyclohexyl)ethyltriethoxysilane.

Into a beaker were added SPAN 80 surfactant (2.73 grams) and TWEEN 40 surfactant (2.77 grams) which were heated together in a hot water bath in order to melt the solid material. The surfactant mixture was mixed with Silane J (22.0 grams). Water (27.5 grams) was added and the mixture was stirred vigorously for approximately five minutes to provide a white emulsion.

13. Preparation of Emulsion of Silane K, β-(3, 4-Epoxycyclohexyl)ethyl tris-(isobutoxy) Silane.

SPAN 60 surfactant (2.36 grams) and TWEEN 40 surfactant (1.04 grams) were mixed together in a beaker and heated in a hot water bath to melt the solid material. Silane K (26.0 grams) was added and the mixture was stirred with a mechanical stirrer for 10 minutes. Water (35.1 grams) was added and the mixture was stirred for approximately ten minutes. GIV-GARD DXN preservative was added.

14. Preparation of Emulsion of Silane L, 3-Glycidoxypropyl tris-(isobutoxy)silane.

Into a beaker were added SPAN 60 surfactant (2.72 grams) and TWEEN 40 surfactant (1.18 grams), which were heated together in a hot water bath in order to melt the solid material. Silane L (20.0 grams) was added and the mixture was stirred with a mechanical stirrer. Water (27 grams) was added and the mixture was stirred vigorously for approximately thirty minutes to provide a white emulsion. GIV-GARD DXN preservative was added.

15. Preparation of Emulsion of Silane M, 3-Methacryloxypropyltriethoxysilane.

Into a beaker were added SPAN 60 surfactant (2.9 grams) and TWEEN 40 surfactant (1.9 grams) which were heated together in a hot water bath to melt the solid materials. 3-Methacryloxypropyltriethoxysilane (24.0 grams) was added and the mixture was stirred with a mechanical stirrer. Water (31.2 grams) was added and the mixture was stirred vigorously for approximately thirty minutes to provide a white emulsion. GIV-GARD DXN preservative was added.

16. Preparation of Emulsion of Silane N, Tris-(3-triethoxysilylpropyl)isocyanurate.

Into a beaker were added SPAN 60 surfactant (1.85 grams) and TWEEN 40 surfactant (1.75 grams) which were heated together in a hot water bath to melt the solid materials. Silane N (24.0 grams) was added and the mixture was stirred with a mechanical stirrer. Water (32.4 grams) were added and the mixture was stirred vigorously for approximately thirty minutes to provide a white emulsion. GIV-GARD DXN preservative was added.

The compositions of the silane emulsions are summarized in Table II.

EXAMPLES 17–68

Into a 200 ml reaction vessel that was equipped with a mechanical stirrer were charged silylated acrylic latex A (Example 1, 91.75 grams) and Silane F emulsion (Example 7, 5.00 grams). The mixture was stirred for 5 minutes. ACRYSOL SCT-275 rheology modifier from Rohm & Haas (0.25 grams) and diethylene glycol monobutyl ether acetate (3.0 grams) were added. Compositions of present invention were prepared in a manner similar to Example 17 for Examples 18–68. The composition of Examples 17–68 are summarized in Table III.

Comparative Examples I–XXXIX.

Comparative examples were prepared in a manner similar to Example 17. Composition of Comparative Examples I–XXXIX are summarized in Table III.

EXAMPLE 69–120

Films were prepared by casting them with compositions described above using a draw-down bar onto phosphated stainless steel panels. The dry film thickness was 2 mils [50.8 μm]. The films were cured at 121° C. for 20 minutes and 23° C. for 7 days at a 50 percent relative humidity.

The utility of the compositions of the present invention is shown by the improvement in solvent resistance and adhesion of the cured compositions. The solvent resistance was determined by MEK double rubs tests conducted as set forth in ASTM D4752-87. The data given in Table V show that the mixtures of the silylated acrylic latex A (3.0 percent silane monomer in polymer) and alkoxy silane emulsions have better solvent resistance than the silylated acrylic latex A alone or mixtures of acrylic latex Y (no silane) and alkoxy silane emulsions. For example, the compositions of the present invention illustrated by examples 71–82 have solvent resistance ranging from 228 to greater than 400 MEK double rubs. The silylated acrylic A latex alone and with curing catalyst FOMREZ UL-22 from Witco (Comparative Examples XL and XLI) had solvent resistance of 89 and 53 MEK double rubs, respectively. Mixtures of alkoxy silane emulsions with acrylic latex Y (no silane) had solvent resistance ranging from 10 to 43 MEK double rubs, as shown in Comparative Examples XLIII to LII.

The level of silylation of the acrylic polymer has an effect on the solvent resistance of the compositions of the present example. The solvent resistance of mixtures of silylated acrylic latex B (1 percent silane monomer in polymer) and alkoxy silane emulsions (compositions 31 to 36) ranged from 35 to 113 MEK double rules, as shown in Examples 83 to 88. The solvent resistance of silylated acrylic latex B alone was only 23 MEK double rubs (comparative example XLII).

The improvement in solvent resistance of compositions of the present invention is also observed for mixtures of silylated vinyl acrylic polymer latices and alkoxy silane emulsions. Mixtures of silylated vinyl acrylic latex C (2.0 percent silane monomer in polymer) and alkoxy silane emulsions had solvent resistance in a range of 13 to 40 rubs, as shown in Examples 89 to 98. The solvent resistance of a vinyl acrylic latex Z (no silane) alone (comparative Example LX) was 7 MEK rubs. Mixtures of vinyl acrylic latex Z and alkoxy silane emulsions had solvent resistance ranging from 8 to 15, as shown in Comparative Examples LVI to LIV.

The dry and wet adhesion of the compositions of the present invention was generally very good to excellent. The dry adhesion was determined on cured, 2 mil (25.4 μm) films using the crosscut tape adhesion test as described in ASTM 3359-90. The wet adhesion was measured on cured films using Method 6301 of U.S. Federal Standard Test Method 141B. Examples 69 to 88, mixtures of silylated acrylic latex A and alkoxy silane emulsions, gave 5B dry adhesion and excellent wet adhesion, except for Examples 74, 85, and 86. Comparative Examples XL, XLI, and XLIII through LV generally had low dry adhesion (values varying from 0B to 5B) and poor wet adhesion.

The hardness of the cured films of the present invention were generally harder than comparative examples. The pencil hardness was determined on 2 mil (50.8 μm] cured films using ASTM D-3363-74. During the measurement of the pencil hardness, several of the compositions of the present invention showed the ability to self heal. Self-healing occurs when the scratch made by the pencil hardness test disappears from the cured film on standing for five minutes. Examples 82 to 89 and 109 to 120 exhibited the self-healing phenomenon, while Comparative Examples XLIII to LIII and LXI did not.

The compositions of the present invention were shelf-stable. The shelf-stability of the compositions was determined by observing the formation of gel particles or phase separation. Examples 69 to 120 were stable for at least 3 months and generally greater than 6 months.

The differences in the solubility parameters between the polymer and alkoxy silane were in a range of 0.1 and 1.50, as shown in Table V. The alkoxy silanes were, therefore, generally compatible with the polymer. The solubility parameters were calculated according to the procedures outlined in the CRC Handbook of Solubility Parameters and Other Cohesion Parameters. The calculated solubility parameters for alkoxy silanes and polymers are given in Table IV.

TABLE I

Compositions of the Polymer Emulsions Examples

Ingredients — Weight by Percent of Ingredients

| Example No. | 1 | 2 | 3 | 4 | 5 | 6 | 7 |
|---|---|---|---|---|---|---|---|
| Polymer | A | B | Y | C | D | Z | E |
| 3-methacryloxypropyl-trimethoxysilane | 1.31 | 0.46 | — | 1.00 | 0.10 | — | 0.44 |
| butyl acrylate | 20.72 | 22.08 | 22.21 | 6.50 | 7.40 | 7.0 | 21.15 |
| methyl methacrylate | 21.20 | 22.59 | 22.73 | — | — | — | 21.65 |
| methacrylic acid | 0.57 | 0.59 | 0.60 | — | — | — | 0.57 |
| vinyl acetate | — | — | — | 42.50 | 42.50 | 42.50 | — |
| (silane content of polymer) | (3.00) | (1.00) | (0) | (2.00) | (0.20) | (0) | (1.00) |
| IGEPAL CA-897 | 4.00 | 3.78 | 3.80 | 2.65 | 2.65 | 2.65 | 4.00 |
| IGEPAL CA-630 | — | — | — | 0.30 | 0.30 | 0.30 | — |
| ferrous sulfate | 0.00086 | — | — | — | — | — | .00015 |
| ammonium persulfate | 0.14 | — | — | — | — | — | 0.14 |
| sodium persulfate | — | 0.10 | 0.10 | 0.18 | 0.18 | 0.18 | — |
| sodium formaldehyde sulfoxylate | 0.046 | 0.024 | 0.024 | 0.050 | 0.050 | 0.050 | 0.046 |
| t-butyl hydroperoxide -70 | 0.0095 | 0.0099 | 0.010 | 0.010 | 0.010 | 0.010 | 0.01 |
| sodium bicarbonate | — | — | — | 0.20 | 0.20 | 0.20 | — |
| NATROSOL 250 MXR | — | — | — | 0.25 | 0.25 | 0.25 | — |
| ABEX EP-110 | — | — | — | 0.36 | 0.36 | 0.36 | — |
| water | 52.00 | 50.37 | 50.53 | 46.00 | 46.00 | 46.50 | 52.00 |

TABLE II

Compositions of the Alkoxy Silane Emulsions Examples

| Example No. | Silane | Concn. Sln. Wt. Percent | Surfactant | Concn. Surf. Wt. Percent | Water Concn. Wt. Percent |
|---|---|---|---|---|---|
| 8 | F | 40.0 | SPAN 60 | 3.64 | 54.0 |
|   |   |      | TWEEN 40 | 2.36 |      |
| 9 | G | 40.0 | SPAN 60 | 4.11 | 52.0 |
|   |   |      | TWEEN 40 | 3.89 |      |
| 10 | H | 40.0 | SPAN 60 | 5.49 | 52.1 |
|    |   |      | TWEEN 40 | 2.37 |      |
| 11 | I | 40.0 | ARQUAD 2C75 | 2.00 | 55.6 |
|    |   |      | ARMEEN DMCD | 2.00 |      |
|    |   |      | SURFYNOL 420 | 0.40 |      |
| 12 | J | 40.0 | SPAN 80 | 4.96 | 50.0 |
|    |   |      | TWEEN 40 | 5.04 |      |
| 13 | K | 40.3 | SPAN 60 | 3.66 | 54.4 |
|    |   |      | TWEEN 40 | 1.61 |      |
| 14 | L | 39.3 | SPAN 60 | 5.34 | 53.1 |
|    |   |      | TWEEN 40 | 2.32 |      |
| 15 | M | 40.0 | SPAN 60 | 4.83 | 52.0 |
|    |   |      | TWEEN 40 | 3.17 |      |
| 16 | N | 40.0 | SPAN 60 | 3.08 | 54.0 |
|    |   |      | TWEEN 40 | 2.92 |      |

F — methyl tris-(isobutoxy)silane
G — amyl triethoxysilane
H — amyl tributoxysilane
I — octyl triethoxysilane
J — β-(3,4-epoxycyclohexyl)ethyltriethoxysilane
K — β-(3,4-epoxycyclohexyl)ethyl tris-(isobutoxy)silane
L — 3-glycidoxypropyl tris-(isobutoxy)silane
M — 3-methacryloxypropyltriethoxysilane
N — tris-(3-triethoxysilylpropyl) isocyanurate Table III Compositions of Examples

| Example No. | Polymer | Concn. Poly Wt. Percent | Alkoxy Silane | Concn. Sln. Wt. Percent | Surfactant Concn. Wt. Percent[1] | Other Ingredients Wt. Percent[2] | Water Wt. Percent |
|---|---|---|---|---|---|---|---|
| 17 | A | 40.19 | F | 2.00 | 3.97 | 3.42[3] | 50.43 |
| 18 | A | 40.19 | G | 2.00 | 4.07 | 3.42[3] | 49.68 |
| 19 | A | 40.19 | H | 2.00 | 4.07 | 3.42[3] | 49.68 |
| 20 | A | 31.43 | H | 10.00 | 4.87 | 3.38[3] | 50.32 |
| 21 | A | 30.99 | H | 10.00 | 4.83 | 4.38[3] | 49.80 |
| 22 | A | 40.19 | I | 2.00 | 3.89 | 3.42[3] | 50.50 |

Table III-continued

Compositions of Examples

| Example No. | Polymer | Concn. Poly Wt. Percent | Alkoxy Silane | Concn. Sln. Wt. Percent | Surfactant Concn. Wt. Percent[1] | Other Ingredients Wt. Percent[2] | Water Wt. Percent |
|---|---|---|---|---|---|---|---|
| 23 | A | 40.19 | J | 2.00 | 4.17 | 3.42[3] | 50.22 |
| 24 | A | 31.43 | J | 10.00 | 6.17 | 3.38[3] | 49.02 |
| 25 | A | 38.00 | J/N | 2.60/2.00 | 4.27 | 3.40[3] | 50.33 |
| 26 | A | 40.19 | K | 2.00 | 3.93 | 3.42[3] | 50.46 |
| 27 | A | 39.75 | K | 2.00 | 3.89 | 4.41[3,5] | 50.05 |
| 28 | A | 40.19 | L | 2.00 | 4.05 | 3.42[3] | 50.34 |
| 29 | A | 40.19 | M | 2.00 | 4.07 | 3.42[3] | 50.32 |
| 30 | A | 40.19 | N | 2.00 | 3.97 | 3.42[3] | 50.42 |
| 31 | B | 42.98 | F | 2.00 | 3.85 | 1.13[4] | 50.04 |
| 32 | B | 42.98 | G | 2.00 | 3.95 | 1.13[4] | 49.94 |
| 33 | B | 42.98 | H | 2.00 | 3.94 | 1.13[4] | 49.95 |
| 34 | B | 42.98 | I | 2.00 | 3.78 | 1.13[4] | 50.11 |
| 35 | B | 42.98 | J | 2.00 | 4.05 | 1.13[4] | 49.84 |
| 36 | B | 42.98 | K | 2.00 | 3.81 | 1.13[4] | 50.08 |
| 37 | B | 42.98 | L | 2.00 | 3.93 | 1.13[4] | 49.96 |
| 38 | C | 47.50 | F | 2.00 | 3.10 | 1.00 | 46.40 |
| 39 | C | 47.50 | G | 2.00 | 3.26 | 1.00 | 46.24 |
| 40 | C | 47.50 | H | 2.00 | 3.19 | 1.00 | 46.31 |
| 41 | C | 37.50 | H | 10.00 | 4.17 | 0.79 | 47.54 |
| 42 | C | 47.50 | J | 2.00 | 3.03 | 1.00 | 46.47 |
| 43 | C | 47.50 | J | 2.00 | 3.30 | 1.00 | 46.20 |
| 44 | C | 37.50 | J | 10.00 | 4.71 | 0.79 | 47.00 |
| 45 | C | 47.50 | K | 2.00 | 3.06 | 1.00 | 46.44 |
| 46 | C | 47.50 | L | 2.00 | 3.10 | 1.00 | 46.32 |
| 47 | D | 47.50 | F | 2.00 | 3.10 | 1.00 | 46.40 |
| 48 | D | 47.00 | F | 2.00 | 3.07 | 1.99[5] | 45.94 |
| 49 | D | 47.50 | G | 2.00 | 3.26 | 1.00 | 46.24 |
| 50 | D | 47.50 | H | 2.00 | 3.19 | 1.00 | 46.31 |
| 51 | D | 47.50 | 1 | 2.00 | 3.03 | 1.00 | 46.47 |
| 52 | D | 47.50 | J | 2.00 | 3.30 | 1.00 | 46.20 |
| 53 | D | 37.50 | J | 10.00 | 4.71 | 0.79 | 47.00 |
| 54 | D | 47.50 | K | 2.00 | 3.06 | 1.00 | 46.44 |
| 55 | D | 47.50 | L | 2.00 | 3.18 | 1.00 | 46.32 |
| 56 | D | 47.50 | M | 2.00 | 3.20 | 1.00 | 46.30 |
| 57 | E | 38.934 | F | 2.00 | 3.85 | 3.42[3] | 51.80 |
| 58 | E | 38.93 | G | 2.00 | 3.85 | 3.42[3] | 51.80 |
| 59 | E | 38.93 | H | 2.00 | 3.94 | 3.42[3] | 51.71 |
| 60 | E | 30.44 | H | 10.00 | 4.73 | 3.39[3] | 51.44 |
| 61 | E | 38.93 | I | 2.00 | 3.77 | 3.42[3] | 51.88 |
| 62 | E | 38.93 | J | 2.00 | 4.05 | 3.42[3] | 51.60 |
| 63 | E | 30.44 | J | 10.00 | 5.28 | 3.39[3] | 51.60 |
| 64 | E | 36.81 | J/N | 2.00/2.00 | 4.16 | 3.41[3] | 51.62 |
| 65 | E | 38.93 | K | 2.00 | 3.81 | 3.42[3] | 51.84 |
| 66 | E | 38.93 | L | 2.00 | 3.93 | 3.42[3] | 51.72 |
| 67 | E | 38.93 | M | 2.00 | 3.95 | 3.42[3] | 51.70 |
| 68 | E | 38.93 | N | 2.00 | 3.85 | 3.42[3] | 51.80 |
| Comparative Examples | | | | | | | |
| I | A | 42.38 | — | — | 3.87 | 3.42[3] | 50.33 |
| II | A | 41.94 | — | — | 3.83 | 4.41[3,5] | 49.81 |
| III | B | 45.26 | — | — | 3.74 | 1.13[3] | 49.87 |
| IV | Y | 33.62 | G | 10.00 | 4.80 | 1.10[4] | 50.48 |
| V | Y | 33.62 | G | 10.00 | 4.80 | 1.10[4] | 50.48 |
| VI | Y | 33.62 | H | 10.00 | 4.77 | 1.10[4] | 50.51 |
| VII | Y | 33.62 | I | 10.00 | 3.93 | 1.10[4] | 51.35 |
| VIII | Y | 33.62 | J | 10.00 | 5.30 | 1.10[4] | 49.98 |
| IX | Y | 33.62 | K | 10.00 | 4.12 | 1.10[4] | 51.16 |
| X | y | 33.62 | L | 10.00 | 4.72 | 1.10[4] | 50.56 |
| XI | Y | 33.62 | M | 10.00 | 4.80 | 1.10[4] | 50.48 |
| XII | Y | 33.62 | N | 10.00 | 4.30 | 1.10[4] | 50.98 |
| XIII | Y | 44.98 | — | — | 3.76 | 1.13[3] | 50.13 |
| XIV | C | 50.00 | — | — | 2.95 | 1.05 | 46.00 |
| XV | D | 50.00 | — | — | 2.95 | 1.05 | 46.00 |
| XVI | E | 42.43 | — | — | 3.87 | 3.33[3] | 50.36 |
| XVII | Z | 37.13 | F | 10.00 | 3.71 | 0.79 | 48.37 |
| XVIII | Z | 37.13 | H | 10.00 | 4.18 | 0.79 | 47.90 |
| XX | Z | 37.13 | j | 10.00 | 4.71 | 0.79 | 47.37 |
| XXI | Z | 49.50 | — | — | 2.95 | 1.05 | 46.50 |
| XXII | A | 41.50 | F[6] | 2.00 | 3.79 | 3.43[3] | 49.27 |
| XXIII | A | 41.50 | G[6] | 2.00 | 3.79 | 3.43[3] | 49.27 |
| XXIV | A | 41.50 | H[6] | 2.00 | 3.79 | 3.42[3] | 49.27 |
| XXV | A | 41.50 | I[6] | 2.00 | 3.79 | 3.43[3] | 49.27 |

Table III-continued

Compositions of Examples

| Example No. | Polymer | Concn. Poly Wt. Percent | Alkoxy Silane | Concn. Sln. Wt. Percent | Surfactant Concn. Wt. Percent[1] | Other Ingredients Wt. Percent[2] | Water Wt. Percent |
|---|---|---|---|---|---|---|---|
| XXVI | A | 41.50 | J[6] | 2.00 | 3.79 | 3.43[3] | 49.27 |
| XXVII | A | 41.50 | K[6] | 2.00 | 3.79 | 3.43[3] | 49.22 |
| XXVIII | A | 41.50 | L[6] | 2.00 | 3.79 | 3.43[3] | 49.27 |
| XXIX | A | 41.50 | M[6] | 2.00 | 3.79 | 3.43[3] | 49.27 |
| XXX | A | 41.50 | N[6] | 2.00 | 3.79 | 3.43[3] | 49.27 |
| XXXI | C | 49.00 | F[6] | 2.00 | 2.89 | 1.03 | 45.08 |
| XXXII | C | 49.00 | G[6] | 2.00 | 2.89 | 1.03 | 45.08 |
| XXXIII | C | 49.00 | H[6] | 2.00 | 2.89 | 1.03 | 45.08 |
| XXXIV | C | 49.00 | I[6] | 2.00 | 2.89 | 1.03 | 45.08 |
| XXXV | C | 49.00 | J[6] | 2.00 | 2.89 | 1.03 | 45.08 |
| XXXVI | C | 49.00 | K[6] | 2.00 | 2.89 | 1.03 | 45.08 |
| XXXVII | C | 49.00 | L[6] | 2.00 | 2.89 | 1.03 | 45.08 |
| XXXVIII | C | 49.00 | M[6] | 2.00 | 2.89 | 1.03 | 45.08 |
| XXXIX | C | 49.00 | N[6] | 2.00 | 2.89 | 1.03 | 45.08 |

[1]. The concentration of surfactant was the sum of our surfactant concentrations used to prepare polymer latices and alkoxy silane emulsions.
[2]. Other ingredients include buffer and initiators agents used in the synthesiss of polymer latices.
[3]. Other ingredients include Acrysol SCT-275, a rheology modifier (0.25 weight percent) from Rohm & Haas of PA, and diethylene glycol monobutyl ether acetate (3.0 weight percent).
[4]. Other ingredients included Acrysol SCT-275 (1.00 percent).
[5]. Other ingredients included U2-22 catalyst (1.0 weight percent).
[6]. Silane was added to composition (II)–(III) as a neat material.

TABLE IV

Calculated Solubility Parameters for Polymers and Alkoxy silanes.

| Structure | Solubility Parameter $\delta$ (cal cm$^{-3}$)$^{1/2}$ |
|---|---|
| Polymer A | 9.1 |
| Polymer B | 9.1 |
| Polymer Y | 9.1 |
| Polymer C | 9.5 |
| Polymer D | 9.5 |
| Polymer Z | 9.5 |
| Silane F | 8.8 |
| Silane I | 8.0 |
| Silane J | 9.4 |
| Silane L | 8.8 |
| Silane M | 9.7 |

1. The solubility parameters were calculated according to the calculated values of for some polymers and the group molar attraction constants, 25° C. from CRC Handbook of Solubility Parameters and Other Cohesion Parameters, Allan F. M. Barton, CRC Press, Inc., Florida, 1983 at page 70, and D. W. van Krevelen and P. J. Hoftyzer, Properties of Polymers: Their Estimation and Correlation with Chemical Structure, Elsevier, New York, 1976.

TABLE V

Data from the Evaluations of Compositions of Present Invention and Comparative Examples

| Example No. | Composition No. | Resistance MEK Rubs. | Adhesion Dry | Wet | Hardness | Self-Healing | Solubility Parameter $\Delta\delta$ (cal cm$^{-3}$)$^{1/2}$ | Shelf-Stability, Months |
|---|---|---|---|---|---|---|---|---|
| 69 | 17 | 46 | 5B | excellent | B | | 0.30 | >3 |
| 70 | 18 | 51 | 5B | excellent | HB | | | >3 |
| 71 | 19 | >400 | 5B | excellent | B | | | >3 |
| 72 | 20 | 347 | 5B | excellent | B | | | >3 |
| 73 | 21 | >400 | 5B | excellent | B | | | >3 |
| 74 | 22 | >400 | 5B | poor | B | | 1.10 | >3 |
| 75 | 23 | >400 | 5B | excellent | B | | 0.30 | >3 |
| 76 | 24 | >400 | 5B | excellent | 2B | | 0.30 | >3 |
| 77 | 25 | >400 | 5B | excellent | HB | | | >3 |
| 78 | 26 | >400 | 5B | excellent | B | | | >3 |

TABLE V-continued

Data from the Evaluations of Compositions of Present Invention and Comparative Examples

| Example No. | Composition No. | Resistance MEK Rubs. | Adhesion Dry | Wet | Hardness | Self-Healing | Solubility Parameter Δδ (cal cm$^{-3}$)$^{1/2}$ | Shelf-Stability, Months |
|---|---|---|---|---|---|---|---|---|
| 79 | 27 | >400 | 5B | excellent | B | | | >3 |
| 80 | 28 | 228 | 5B | excellent | HB | | 0.30 | >3 |
| 81 | 29 | >400 | 5B | excellent | B | | 0.60 | >3 |
| 82 | 30 | >400 | 5B | excellent | B | | | >3 |
| 83 | 31 | 66 | 5B | excellent | 3H | yes | 0.30 | >6 |
| 84 | 32 | 52 | 5B | excellent | 3H | yes | | >6 |
| 85 | 33 | 113 | 5B | poor | H | yes | | >6 |
| 86 | 34 | 35 | 5B | poor | 4H | yes | 1.10 | >6 |
| 87 | 35 | 92 | 4B | excellent | 4H | yes | 0.30 | >6 |
| 88 | 36 | 52 | 5B | excellent | F | yes | | >6 |
| 89 | 37 | 40 | 5B | excellent | 3H | yes | 0.30 | >6 |
| 90 | 38 | 37 | 5B | poor | 3H | | 0.70 | >6 |
| 91 | 39 | 17 | 5B | poor | H | | | >6 |
| 92 | 40 | 14 | 5B | excellent | 2H | | | >6 |
| 93 | 41 | 30 | 0B | excellent | H | | | >6 |
| 94 | 42 | 24 | 5B | excellent | 3H | | 1.50 | >6 |
| 95 | 43 | 21 | 5D | excellent | H | | 0.10 | >6 |
| 96 | 44 | 29 | 2B | excellent | F | | 0.10 | >6 |
| 97 | 45 | 27 | 5B | poor | H | | | >6 |
| 98 | 46 | 13 | 5B | poor | 3H | | 0.70 | >6 |
| 99 | 47 | | 5B | poor | H | | 0.70 | >4 |
| 100 | 48 | | 5B | excellent | 4H | | 0.70 | >4 |
| 101 | 49 | | 5B | excellent | H | | | >4 |
| 102 | 50 | | 5B | poor | F | | | >4 |
| 103 | 51 | | 5B | poor | F | | 1.50 | >4 |
| 104 | 52 | | 5B | poor | F | | 0.10 | >4 |
| 105 | 53 | | 5B | excellent | F | | 0.10 | >4 |
| 106 | 54 | | 5B | excellent | H | | | >4 |
| 107 | 55 | | 5B | poor | 2H | | 0.70 | >4 |
| 108 | 56 | | 5B | excellent | H | | 0.20 | >4 |
| 109 | 57 | 278 | 5B | poor | H | yes | — | >3 |
| 110 | 58 | >400 | 5/b | oiir | H | yes | — | >3 |
| 111 | 59 | 196 | 5B | poor | H | yes | — | >3 |
| 112 | 60 | 77 | 5B | poor | H | yes | — | >3 |
| 113 | 61 | 93 | 5B | poor | B | yes | — | >3 |
| 114 | 62 | >400 | 5B | poor | H | yes | — | >3 |
| 115 | 63 | >400 | 5B | poor | H | yes | — | >3 |
| 116 | 64 | >400 | 5B | poor | 2H | yes | — | >3 |
| 117 | 65 | >400 | 5B | poor | 4H | yes | — | >3 |
| 118 | 66 | >400 | 5B | poor | 4H | yes | — | >3 |
| 119 | 67 | >400 | 5B | excellent | 3H | yes | — | >3 |
| 120 | 68 | >400 | 5B | excellent | 4H | yes | — | >3 |
| Comparative Example | | | | | | | | |
| XL | I | 89 | 5B | poor | B | | 0.30 | >3 |
| XLI | II | 53 | 5B | poor | F | | | >3 |
| XLII | III | 23 | 5B | excellent | 3H | yes | | >6 |
| XLIII | IV | 19 | 0B | poor | 3B | no | | >4 |
| XLIV | V | 28 | 0B | poor | B | no | | >4 |
| XLV | VI | 17 | 0B | poor | F | no | | >4 |
| XLVI | VII | | | | | | | >4 |
| XLVII | VIII | 15 | 0B | excellent | B | no | 1.10 | >4 |
| XLVIII | IX | 43 | 0B | poor | H | no | 0.30 | >4 |
| XLIX | X | 16 | 1B | poor | B | no | | >4 |
| L | XI | | 1B | poor | B | no | 0.30 | >4 |
| LI | XII | 10 | 1B | poor | 2B | no | 0.60 | >4 |
| LII | XIII | 19 | 1B | poor | B | no | | >4 |
| LIII | XIV | 14 | 3B | poor | 2B | no | | >6 |
| LIV | XV | 11 | 2B | poor | H | | | >4 |
| LV | XV | | 5B | poor | HB | | | >6 |
| LVI | XVII | 8 | | | | | | >6 |
| LVII | XVIII | 11 | | | | | 0.70 | >6 |
| LVIII | XIX | 10 | | | | | | >6 |
| LIX | XX | 15 | | | | | 1.50 | >6 |
| LX | XXI | 7 | | | | | 0.10 | >6 |
| LXI | XVI | 246 | 5B | poor | H | NO | | >3 |
| LXII | XXII | defect[1] | | | | | | |
| LXIII | XXIII | defect[1] | | | | | | |
| LXIV | XXIV | defect[1] | | | | | | |
| LXV | XXV | defect[1] | | | | | | |
| LXVI | XXVI | defect[1] | | | | | | |
| LXVII | XXVII | defect[1] | | | | | | |

TABLE V-continued

Data from the Evaluations of Compositions of Present Invention and Comparative Examples

| Example No. | Composition No. | Resistance MEK Rubs. | Adhesion Dry | Wet | Hardness | Self-Healing | Solubility Parameter $\Delta\delta$ (cal cm$^{-3}$)$^{1/2}$ | Shelf-Stability, Months |
|---|---|---|---|---|---|---|---|---|
| LXVIII | XXVIII | defect[1] | | | | | | |
| LXIX | XXIX | defect[1] | | | | | | |
| LXX | XXX | defect[1] | | | | | | |
| LXXI | XXXI | defect[1] | | | | | | |
| LXXII | XXXII | defect[1] | | | | | | |
| LXXIII | XXXIII | defect[1] | | | | | | |
| LVXIV | XXXIV | defect[1] | | | | | | |
| LXXV | XXXV | defect[1] | | | | | | |
| LXXVI | XXXVI | defect[1] | | | | | | |
| LXXVII | XXXVII | defect[1] | | | | | | |
| LXXVIII | XXXVIII | defect[1] | | | | | | |
| LXXIX | XXXIX | defect[1] | | | | | | |

[1]Films cast were rough and scaled with craters. MEK rubs were not measured because of poor film quality.

We claim:

1. A composition comprising:
    (I) about 0.1 to 20 weight percent of a water insoluble or slightly soluble, saturated alkoxy silane; (II) about 0.05 to 30 weight percent of an emulsifier; (III) about 30 to 99 weight percent of water; and (IV) about 0.1 to 70 weight percent of a water dispersible or emulsified polymer containing an alkoxy silane functional group, provided that said polymer contains one or more carbon atoms and said alkoxy silane functional group is bound to the polymer through a Si—C bond; wherein said composition is shelf stable.

2. A composition according to claim 1 wherein the water insoluble or slightly soluble, saturated alkoxy silane is of the structure Y–R$^1{}_a$R$^3{}_b$Si(OR$^2$)$_{4-a-b}$ where R$^1$ is an organofunctional substituted alkylene, arylene or aralkylene group, which may have from two to thirty carbon atoms; R$^2$ is an alkyl or alkoxy-substituted alkyl, aryl, or aralkyl group having from two to ten carbon atoms; R$^3$ is an alkyl, aryl or aralkyl group having from one to sixteen carbon atoms, a is zero to two, and b is zero to two, with the proviso that a+b is 1, or 2; and Y is an organofunctional group.

3. A composition according to claim 2 wherein Y is selected from the group consisting of: mercapto, halo, amino, carboxyl, ester, cyano, aldehyde, acids, epoxy, silyl ester functionalities.

4. A composition according to claim 2 wherein R$^2$ is selected from the group consisting of: ethyl, n-propyl, n-butyl, n-hexyl, n-heptyl, n-octyl, n-nonyl, n-decyl, cyclopentyl, cylcohexyl, cycloheptyl, cyclooctyl, isobutyl, isopropyl, sec-butyl, isobutyl, sec-amyl and 4-methyl-2-pentyl.

5. A composition according to claim 2 wherein R$^3$ is selected from the group consisting of: methyl, ethyl, n-propyl, n-butyl, n-hexyl, n-heptyl, n-octyl, lauryl, isopropyl, isobutyl, isoamyl, isopentyl, phenyl, and phenethyl.

6. A composition according to claim 2 wherein R$^1$ is selected from the group consisting of: ethylene, propylene, isopropylene, isobutylene, octylene, phenylene, tolylene, xylene, benzyl, cyclohexylene, and phenylethyl.

7. A composition according to claim 1 wherein the silane and polymer have a difference in Hildebrand solubility parameter of less than 2(cal/cm$^3$)$^{1/2}$.

8. A composition according to claim 7 wherein the silane is selected from the group consisting of methyltris-(isobutoxy)silane, dimethyldipropoxysilane, ethyltris (isopropoxy)silane, propyltris-(isobutoxy)silane, butyltributoxysilane, octyltriethoxysilane, amyltributoxysilane, amyltriethoxysilane, β-(3,4-epoxycylcohexyl)ethyltris(isobutoxy)silane, 3-glycidoxypropyltris-(isobutoxy)silane, dodecyltriethoxysilane, phenyltriethoxysilane, 3-mercaptopropyltriethoxysilane, dimethylbis-(isobutoxy) silane, diethyldipropoxysilane, dibutylbis-(isopropoxy) silane, diphenyldipropoxysilane, 1,2 bis-(ethoxy)silyl ethanes and tris(3-triethoxysilylpropyl)isocyanurate.

9. A composition according to claim 1 wherein the emulsifier is selected from the group consisting of: polyoxyethylene alkyl ethers, polyoxyethylene alkyl phenyl ethers, polyoxyethylene fatty acid esters, sorbitan fatty acid esters, polyoxyethylene sorbitan fatty acid esters, fatty acid salts, alkyl sulfate ester salts, alkyl benzene sulfonate, alkyl phosphate, alkylallyl sulfate ester salt, polyoxyethylene alkylphosphate ester, quaternary ammonium salts.

10. A composition according to claim 1 wherein the silylated polymer contains 0.1 to 4 percent by weight of an alkoxy silane functionality.

11. A composition according to claim 1 additionally comprising a pH buffer.

12. A composition according to claim 1 which when applied to a substrate and cured results in a self-healing coating.

13. A composition according to claim 1 which has a shelf life of at least six months at ambient conditions.

14. A method for the preparation of a shelf stable composition comprising; (a) dispersing a water insoluble or slightly soluble alkoxy silane in an aqueous solution with emulsifier to yield an aqueous emulsion, and (b) adding the silane emulsion to a water dispersed or emulsified organic polymer which contains a silyl ester functional group, provided that said polymer contains one or more carbon atoms and said alkoxy silane functional group is bound to the polymer through a Si—C bond.

15. A method according to claim 13 wherein the resulting composition is shelf-stable for at least six months.

16. A method for coating a substrate comprising preparing a composition according to claim 14 and then
    (c) applying the composition to a substrate; and
    (d) curing said composition.

17. A method according to claim 13 wherein wherein the water insoluble or slightly soluble, saturated alkoxy silane is of the structure Y–R$^1_a$R$^3_b$Si(OR$^2$)$_{4-a-b}$ where R$^1$ is an organofunctional substituted alkylene, arylene or aralkylene group, which may have from two to thirty carbon atoms; R$^2$ is an alkyl or alkoxy-substituted alkyl, aryl, or aralkyl group having from two to ten carbon atoms; R$^3$ is an alkyl, aryl or aralkyl group having from one to sixteen carbon atoms, a is zero to two, and b is zero to two, with the proviso that a+b is 1, or 2; and Y is an organofunctional group.

18. A method according to claim 15 wherein Y is selected from the group consisting of: mercapto, halo, amino, carboxyl, ester, cyano, aldehyde, acids, epoxy, silyl ester functionalities.

19. A method according to claim 15 wherein R$^2$ is selected from the group consisting of: ethyl, n-propyl, n-butyl, h-hexyl, n-heptyl, n-octyl, n-nonyl, n-decyl, cyclopentyl, cylcohexyl, cycloheptyl, cyclooctyl, isopropyl, isobutyl, sec-butyl, isobutyl, sec-amyl and 4-methyl-2-pentyl.

20. A method according to claim 15 wherein R$^3$ is selected from the group consisting of: methyl, ethyl, n-propyl, n-butyl, n-hexyl, n-heptyl, n-octyl, lauryl, isopropyl, isobutyl, isoamyl, isopentyl and phenyl.

21. A method according to claim 15 wherein R$^1$ is selected from the group consisting of: ethylene, propylene, isopropylene, isobutylene, octylene, phenylene, tolylene, xylene, benzyl, cyclohexylene, and phenylethyl.

22. A method according to claim 13 wherein the silane and polymer have a difference in Hildebrand solubility parameter of less than 2(cal/cm$^3$)$^{1/2}$.

23. A method according to claim 15 wherein the silane is selected from the group consisting of methyltris-(isobutoxy) silane, dimethyldipropoxysilane, ethyltris(isopropoxy) silane, propyltris-(isobutoxy)silane, butyltributoxysilane, octyltriethoxysilane, amyltributoxysilane, amyltriethoxysilane, β-(3,4-epoxycylcohexyl)ethyltris (isobutoxy)silane, 3-glycidoxypropyltris-(isobutoxy)silane, dodecyltriethoxysilane, phenyltriethoxysilane, 3-acryloxypropyltriethoxysilane, 3-mercaptopropyltriethoxysilane, dimethylbis-(isobutoxy) silane, diethyldipropoxysilane, dibutylbis-(isopropoxy) silane, diphenyldipropoxysilane, 3-methacryloxypropylmethyl-dibutoxysilane, 1,2 bis-(ethoxy)silyl ethanes and tris(3-triethoxysilylpropyl) isocyanurate.

24. A method according to claim 13 wherein the emulsifier is selected from the group consisting of: polyoxyethylene alkyl ethers, polyoxyethylene alkyl phenyl ethers, polyoxyethylene fatty acid esters, sorbitan fatty acid esters, polyoxyethylene sorbitan fatty acid esters, fatty acid salts, alkyl sulfate ester salts, alkyl benzene sulfonate, alkyl phosphate, alkylallyl sulfate ester salt, polyoxyethylene alkylphosphate ester, quaternary ammonium salts.

25. A method according to claim 13 wherein the silylated polymer contains 0.1 to 4 percent by weight of an alkoxy silane functionality.

26. A method according to claim 13 wherein a pH buffer is also added during step (a).

27. A composition comprising:
(I) about 0.1 to 20 weight percent of a water insoluble or slightly soluble alkoxy silane with an unsaturated functionality thereon; (II) about 0.05 to 30 weight percent of an emulsifier; (III) about 30 to 99 weight percent of water; and (IV) about 0.1 to 70 weight percent of a water dispersible or emulsified polymer containing an alkoxy silane functional group where said alkoxy functional group is different than the silane of (I), provided that said polymer contains one or more carbon atoms and said alkoxy silane functional group is bound to the polymer through a Si—C bond; wherein said composition is shelf stable.

28. A composition according to claim 25 wherein the water insoluble or slightly soluble, saturated alkoxy silane is of the structure Y–R$^1_a$R$^3_b$Si(OR$^2$)$_{4-a-b}$ where R$^1$ is an organofunctional substituted alkylene, arylene or aralkylene group, which may have from two to thirty carbon atoms; R$^2$ is an alkyl or alkoxy-substituted allyl, vinyl, alkyl, aryl, or aralkyl group having from two to ten carbon atoms; R$^3$ is an alkyl, aryl or aralkyl group having from one to sixteen carbon atoms, a is zero to two, and b is zero to two, with the proviso that a+b is 1, or 2; and Y is an organofunctional group.

29. A composition according to claim 26 wherein Y is selected from the group consisting of: mercapto, halo, amino, carboxyl, ester, cyano, aldehyde, acids, epoxy, silyl ester functionalities.

30. A composition according to claim 26 wherein R$^2$ is selected from the group consisting of: vinyl, acryl, maethacryl, ethyl, n-propyl, n-butyl, n-hexyl, n-heptyl, n-octyl, n-nonyl, n-decyl, cyclopentyl, cylcohexyl, cycloheptyl, cyclooctyl, isobutyl, isopropyl, sec-butyl, isobutyl, sec-amyl and 4-methyl-2-pentyl.

31. A composition according to claim 26 wherein R$^3$ is selected form the group consisting of: methyl, ethyl, vinyl, n-propyl, n-butyl, n-hexyl, n-heptyl, n-octyl, lauryl, isopropyl, isobutyl, isoamyl, isopentyl, phenyl, and phenethyl.

32. A composition according to claim 26 wherein R$^1$ is selected from the group consisting of: ethylene, propylene, isopropylene, isobutylene, octylene, phenylene, tolylene, xylene, benzyl, cyclohexylene, and phenylethyl.

33. A composition according to claim 9 wherein the quaternary ammonium salts are selected from the group consisting of long chain alkyl trimethylammonium salts, long chain alkyl benzyl dimethyl ammonium salts, and di(long chain alkyl)dimethyl ammonium salts.

34. A method according to claim 24 wherein the quaternary ammonium salts are selected from the group consisting of long chain alkyl trimethylammonium salts, long chain alkyl benzyl dimethyl ammonium salts, and di(long chain alkyl)dimethyl ammonium salts.

* * * * *